Jan. 27, 1970 E. T. ABLE 3,491,579
TORQUE TOOL TESTERS
Filed March 27, 1968 3 Sheets-Sheet 3

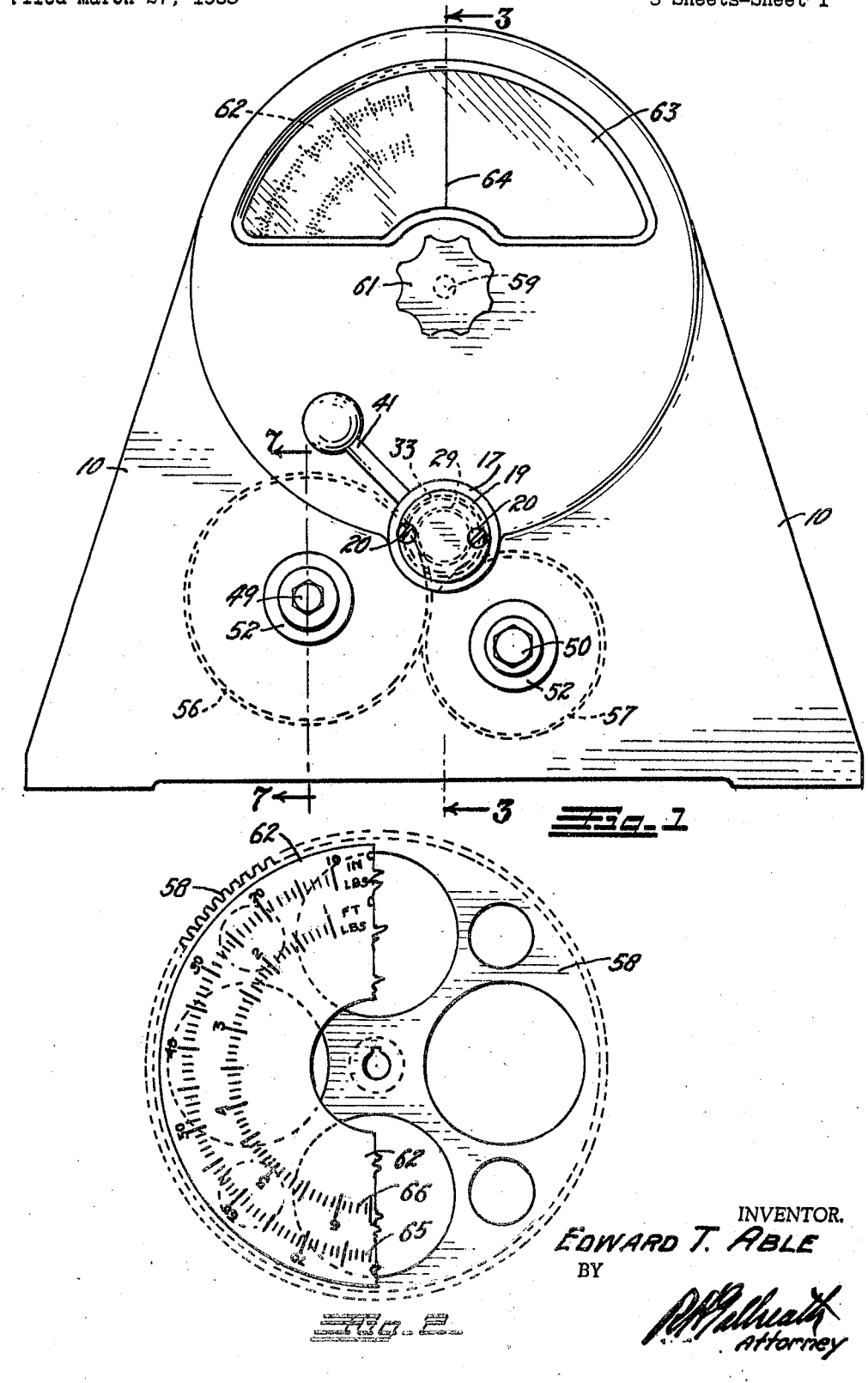

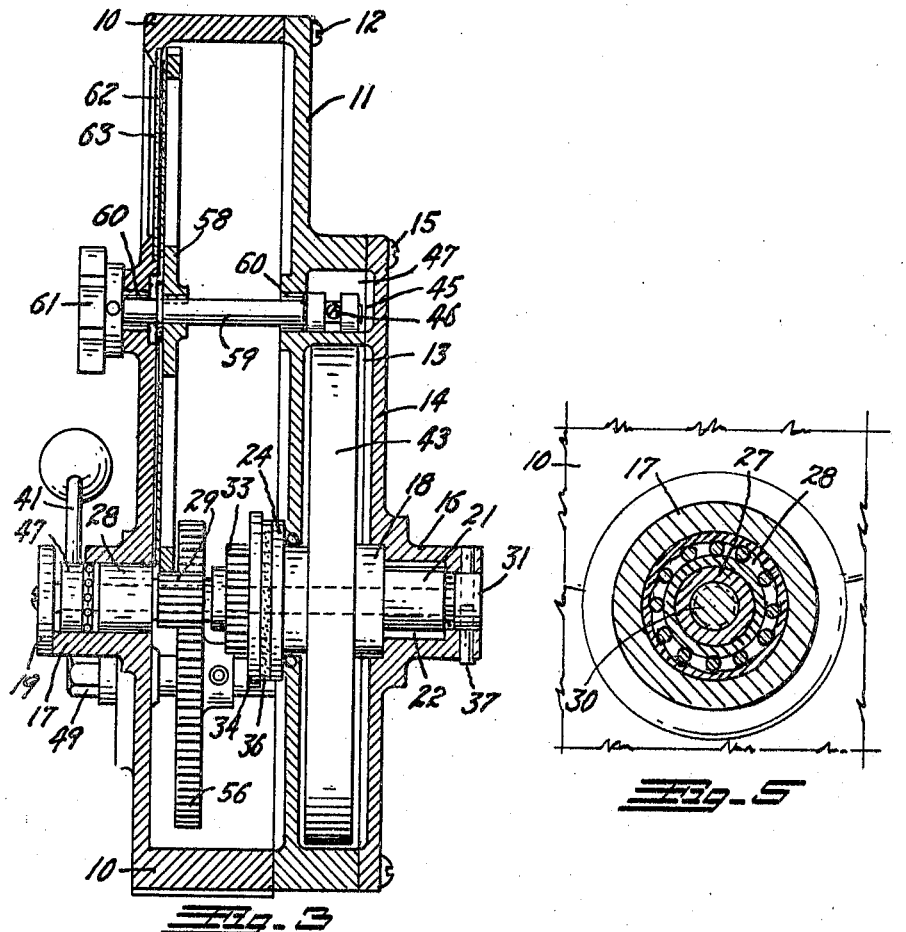
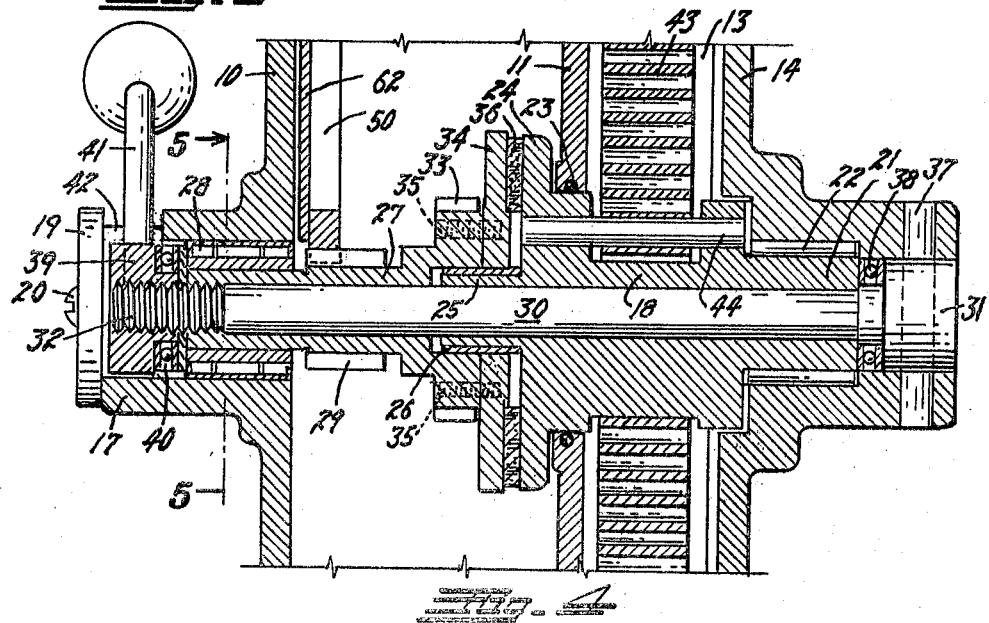

United States Patent Office 3,491,579
Patented Jan. 27, 1970

3,491,579
TORQUE TOOL TESTERS
Edward T. Able, Denver, Colo., assignor to B. K. Sweeney
Manufacturing Co., Denver, Colo., a corporation of
Colorado
Filed Mar. 27, 1968, Ser. No. 716,613
Int. Cl. G01l 25/00
U.S. Cl. 73—1                                      7 Claims

ABSTRACT OF THE DISCLOSURE

Two tool-receiving shafts are both geared, at differing ratios, to a clutch sleeve which in turn rotates a spring hub through a manually-controlled friction clutch so as to apply torque to and wind a spiral spring. A resettable dial is geared to the clutch sleeve through a directionable clutch to indicate, and retain the indication, of the maximum degree of rotation imparted to the clutch sleeve by a torque tool applied to either of the tool-receiving shafts.

---

This invention relates to an instrument by means of which the torque output of tools, such as power-actuated wrenches, power-actuated screw drivers and similar tools may be periodically tested to calibrate the maximum torque output of the tool. The invention is more particularly applicable for use on pneumatic and electric power tools which stall, or automatically cease operating, when a predetermined maximum of torque has been delivered to the work.

The principal object of the invention is to provide a relatively simple, easily used and highly efficient tester which will accurately indicate, and retain the indication, of the maximum torque delivered by a tool at the point of stall, or at the point of automatic shut-off.

Another object is to so construct the tester that its accuracy will not be dependent upon the position of the tester when in use, so that it may be held, set or mounted in any convenient position without effecting the accuracy of the torque indications.

Further objects are: to provide a plurality of power input means so that tools of various torque ranges can be tested without change in the testing mechanism; to provide a torque-indicating dial which can be quickly and easily reset for the next successive test; and to provide safe and easily actuated means for releasing the stored energy accumulated during a test before proceeding with the next successive test.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a front elevational view of the torque tool tester;

FIG. 2 is a broken-away detail view of a dial assembly as used in the improved tester;

FIG. 3 is a vertical section taken on the line 3—3, FIG. 1, with internal elements shown in elevation;

FIG. 4 is an enlargement of a portion of FIG. 3 with the internal parts shown in section;

FIG. 5 is a similarly enlarged fragmentary cross-section taken on the line 5—5, FIG. 4;

Figure 6:
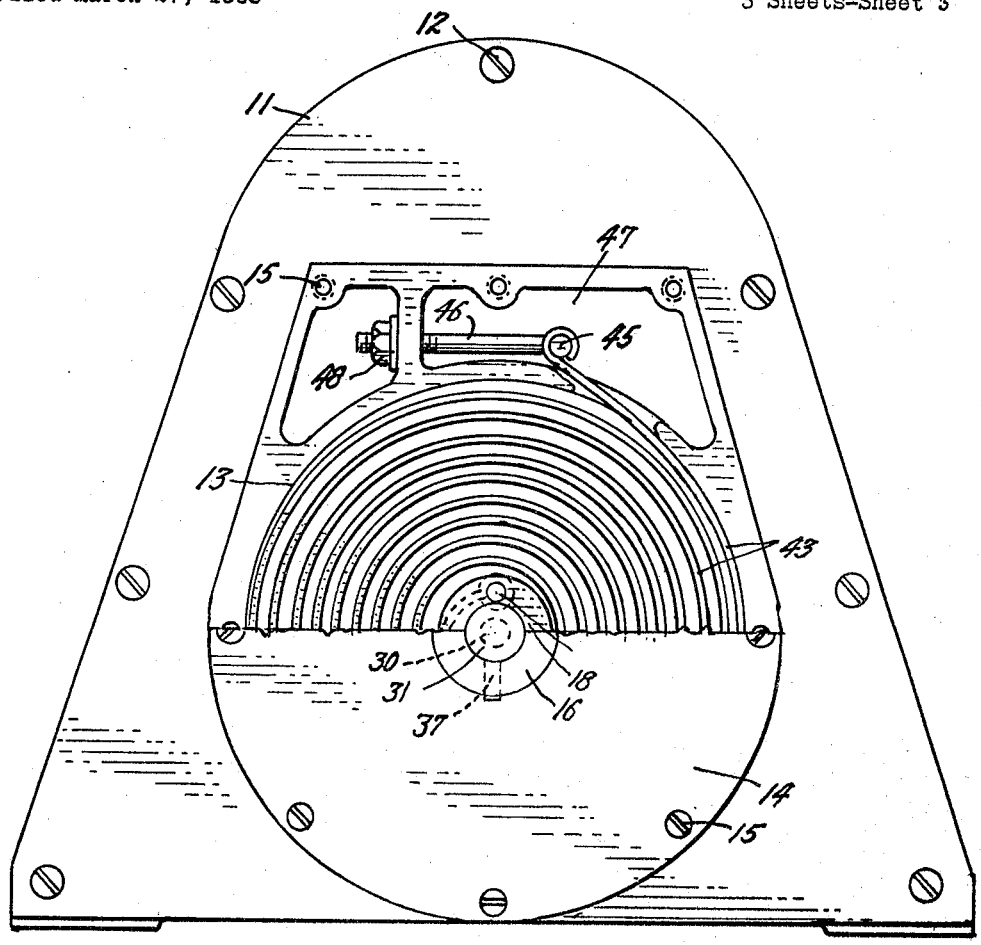
FIG. 6 is a rear elevational view of the tester with its rear back plate partially broken away to show the internal structure.
Figure 7:
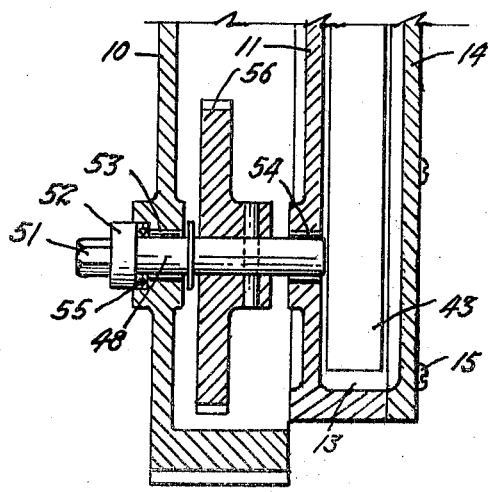
FIG. 7 is a fragmentary vertical section on the line 7—7, FIG. 1.

The tester of this invention is enclosed in a hollow metallic housing 10, the open back of which is closed by a first back plate 11 secured in place thereon by means of suitable cap screws 12. A hollow spring chamber 13 is cast or otherwise formed on the rear face of the back plate 11 and the spring chamber is in turn closed by means of a rear back plate 14 secured in place thereon by means of additional cap screws 15.

A tubular rear bearing boss 16 projects rearwardly from the second back plate 14 and a similar forward bearing boss 17 projects forwardly from the front of the housing 10 in axial alignment with the rear bearing boss 16. The forward extremity of the forward bearing boss 17 is closed by a circular cover plate 19 secured to the boss by means of suitable cap screws 20.

A spool-like spring hub 18 is maintained in the spring chamber 13, in axial alignment with the bosses 16 and 17, by means of an integrally formed, rear tubular bearing portion 21 which is journalled in the rear bearing boss 16 in a suitable roller bearing assembly 22.

The spring hub 18 extends forwardly through a sealing gasket 23 in the first back plate 11 and is flanged to form a flat, annular, rear clutch disc 24. A forward, tubular, bearing portion 25 is formed on the spring hub 18 and projects forwardly therefrom, through a bearing bushing 26, into an axially positioned socket in the rear extremity of a tubular clutch sleeve 27. The forward extremity of the clutch sleeve 27 is journalled in a directional clutch bearing 28 in the forward bearing boss 17.

Teeth are milled in the clutch sleeve 27 rearwardly of the bearing 28, to form a relatively wide, first, driven pinion 29 and a second driven pinion 33 is formed on, and adjacent the rear extremity of, the clutch sleeve 27. A forward clutch disc 34 is concentrically mounted on the latter rear extremity and is attached to the rear face of the pinion 33 in any suitable manner such as by means of attachment screws 35. An annular friction clutch liner 36 is positioned between the forward and rear clutch discs 34 and 24.

An elongated tension bolt 30, provided with a cylindrical head 31 at its rear extremity and with suitable threads 32 at its forward extremity, extends axially through the spring hub 18 and its bearing portions 21 and 25 and through the tubular clutch sleeve 27. The head 31 is locked against movement in the rear bearing boss 16 by means of a transverse key pin 37 and a suitable thrust bearing 38 is positioned between the head and the bearing portion 21 of the spring hub 18 to rotatably absorb axial thrust of the hub.

A clutch clamping nut 39 is threaded on the threads 32 of the tension bolt 30 within the forward bearing boss 17, which, when rotated clockwise on the stationary tension bolt 30, will apply tension to the latter so as to exert axial pressure, through a thrust bearing assembly 40, on the clutch sleeve 27 to urge the clutch discs 24 and 34 into clutching engagement with the clutch liner 36. A clutch lever 41 is mounted in the clutch clamping nut 39 and projects upwardly, through a circumferential clearance slot 42 in the forward bearing boss 17, by means of which, the clutch may be actuated to and from the clutched position. When in the clutched position, the clutch sleeve 27 is clutched to the spring hub 18.

A spiral leaf spring 43, similar to a clock main spring, spirally surounds the spring hub 18 and is secured at its inner extremity about a spring pin 44, in the hub, and at its outer extremity about a T-head 45 on a spring screw 46 which is positioned in a screw cavity 47 above the spring chamber 13 and provided with a spring adjusting nut 48, as shown in FIG. 6. It can be seen that, with the clutch engaged, torque can be applied to, and stored in, the spring 43 by counter-clockwise rotation (when viewed from the front) of the clutch sleeve 27.

Rotation is imparted to the clutch sleeve 27 from either one of two similar input shafts 49 and 50 which project forwardly from the housing 10 in spaced-apart relation. The input shafts are similar and each is provided a tool-receiving hex 51 and a thrust flange 52 at its forward extremity and each is journalled in a first roller bearing 53, in the forward face of the housing, and a second roller bearing 54 in the first back plate 11. A thrust bearing 55 transfers axial thrust from the thrust flange 52 to the housing 10. The hex 51 on the shaft 50 is relatively smaller than the hex on the shaft 49.

A relatively large drive gear 56 is keyed to the shaft 49 in mesh with the rear portion of the first driven pinion 29 and relatively smaller drive gear 57 is similarly secured to the shaft 50 in mesh with the second driven pinion 33. It can be seen, that due to the relative sizes of the drive gears 56 and 57, the shaft 50 will apply a greater leverage to wind the spring 43 than the shaft 49.

A dial gear 58 is also meshed with the first driven pinion 29 forwardly of the drive gear 56. The dial gear is keyed to a dial shaft 59, journalled in suitable bearings 60 in the front of the housing 10 and in the back plate 11 above the clutch sleeve 27, and provided at its forward extremity with an instrument knob 61. A scaled dial plate 62 is secured to the face of the dial gear (as shown in FIG. 2) so as to be visible through a window 63 in the front of the housing. The window is provided with a vertical hair line 64 to indicate positions on the dial plate 62. The dial plate is provided with two scales, an "inch-pound" scale 65 which is read by the hair line 64 when tool is applied to the input shaft 49 and a "foot-pound" scale 66 to be read when the tool is applied to input shaft 50.

The directional clutch bearing 28 is of a conventional type, such as a "Torrington RCB 162117," consisting of inner and outer cylindrical races between which bearing rollers and clutch rollers are positioned. The outer race is internally contoured to cause the clutch rollers to exert a ratchet effect so as to allow free relative movement between the races in one direction and to clutch the races together to prevent relative movement in the reverse direction. In the present invention, the outer race is fixedly expanded in the forward bearing boss 17, the inner race is fixedly shrunk on the clutch sleeve 27 and the direction of the "ratchet effect" is such as to allow free counter-clockwise rotation of the clutch sleeve 27 and constantly prevent reversal or clockwise rotation thereof.

OPERATION

It is believed that the operation will be apparent to one skilled in the art from the above specification. Briefly, at the start of each test the clutch lever 41 is initially moved counter-clockwise to release the clutch discs 24 and 34 and release any stored torque in the spring 43 and to allow the clutch sleeve 27 to be freely rotated counter-clockwise. The dial shaft 59 is now rotated clockwise, through the medium of the instrument knob 61, to place the zero indications of the scales 65 and 66 at the hair line 64.

The clutch lever is now rotated clockwise to fixedly inter-engage the clutch discs 24 and 34 with the liner 36 and the work socket of the tool to be tested is slipped over one of the tool-receiving shafts, a low torque tool being connected to the shaft 49 and a high torque being connected to the shaft 50. The tool is now energized to wind the spring 43, through the medium of the clutch assembly, and to simultaneously rotate the dial plate 62 clockwise.

The application of power is continued until the tool either stalls or releases, depending upon its type. The reaction of the spring 43 now tends to reverse the inner race of the directional clutch bearing assembly 28. Reverse movement is prevented, however, by the latter assembly and the spring hub 18 and the dial plate 62 remain stationary so that the indication of the maximum torque developed by the tool will remain at the hair line for recording. It is advisable to take several readings on the same tool so that an average of readings may be obtained to eliminate the possibility of human error.

While a specific form of the invention has been described and illustrated herein, it is to be understood that the same may be varied without departing from the spirit of the invention.

Having thus described the invention what is claimed and desired to be secured by Letters Patent is:

1. A torque tool tester comprising:
   (a) a spiral leaf spring anchored at its outer extremity;
   (b) a rotatable, axially positioned hub to which the inner extremity of said spring is attached;
   (c) a rear clutch disc concentrically mounted on the forward extremity of said hub;
   (d) a forward clutch disc concentrically mounted forwardly of said rear clutch disc;
   (e) a clutch sleeve mounted upon said forward clutch disc and projecting axially forward therefrom;
   (f) means for rotating said clutch sleeve from a torque tool;
   (g) means for urging said clutch sleeve rearwardly when desired to bring said forward clutch disc into rotative engagement with said rear clutch disc to transmit rotation from said sleeve to said hub in a direction to wind said spring; and
   (h) a torque-indicating dial actuated from said clutch sleeve to visibly indicate the degree of rotation of said sleeve.

2. A torque tool tester as described in claim 1 having:
   (a) a directional-clutch surrounding said clutch sleeve and acting to prevent said clutch sleeve from rotating in a reverse or spring-unwinding direction so that said indicating dial will remain stationary when the means for rotating ceases operation.

3. A torque tool tester as described in claim 2 in which the means for rotating said clutch sleeve also includes:
   (a) a second tool-receiving input shaft positioned parallel to the first input shaft;
   (b) a second drive gear mounted on said second input shaft;
   (c) a second driven pinion mounted on said clutch sleeve in axial alignment with the first driven pinion, the gear ratio between the first drive gear and its respective pinion differing from the gear ratio between said second drive gear and its respective pinion to provide two differing power ranges between said input shafts and said clutch sleeve.

4. A torque tool tester as described in claim 2 in which the means for rotating said clutch sleeve comprises:
   (a) a tool-receiving input shaft positioned adjacent said clutch;
   (b) a drive gear mounted on said input shaft; and
   (c) a driven pinion concentrically mounted on said clutch sleeve in mesh with said drive gear so that rotation of said input shaft will impart rotation to said clutch sleeve.

5. A torque tool tester as described in claim 4 in which the means for urging the clutch sleeve rearwardly comprises:
   (a) a stationary tension bolt extending axially through said hub and through said clutch sleeve and having a threaded forward extremity projecting forwardly from said clutch sleeve;
   (b) a head on the rear extremity of said bolt positioned to prevent rearward movement of said hub thereon;
   (c) a nut threaded on the forwardly projecting portion of said bolt positioned to exert rearward axial pressure on said clutch sleeve to urge said clutch discs into rotative engagement; and
   (d) means for manually rotating said nut.

6. A torque tool tester as described in claim 1 in which the means for urging said clutch sleeve rearwardly comprises:
- (a) a stationary tension bolt extending axially through said hub and through said clutch sleeve and having a threaded forward extremity projecting forwardly from said clutch sleeve;
- (b) a head on the rear extremity of said bolt positioned to prevent rearward movement of said hub thereon;
- (c) a nut threaded on the forwardly projecting portion of said bolt positioned to exert rearward axial pressure on said clutch sleeve to urge said clutch discs into rotative engagement; and
- (d) means for manually rotating said nut.

7. A torque tool tester as described in claim 1 having:
- (a) a toothed drive pinion concentrically affixed to said clutch sleeve;
- (b) a dial shaft journalled adjacent said clutch sleeve;
- (c) a driven dial gear concentrically affixed to said dial shaft in mesh with said drive pinion; and
- (d) a torque indicating scale mounted upon said dial shaft.

References Cited
UNITED STATES PATENTS

| | | |
|---|---|---|
| 2,182,519 | 12/1939 | Handy et al. |
| 2,392,260 | 1/1946 | Piatt et al. |
| 3,012,431 | 12/1961 | Schmidt. |
| 3,199,344 | 8/1965 | Able. |
| 3,261,198 | 7/1966 | Able et al. |

LOUIS R. PRINCE, Primary Examiner

HARRY C. POST III, Assistant Examiner

U.S. Cl. X.R.

73—134